(12) United States Patent
Huang

(10) Patent No.: US 10,937,232 B2
(45) Date of Patent: Mar. 2, 2021

(54) DENSE MAPPING USING RANGE SENSOR MULTI-SCANNING AND MULTI-VIEW GEOMETRY FROM SUCCESSIVE IMAGE FRAMES

(71) Applicant: Honeywell International Inc., Morris Plains, NJ (US)

(72) Inventor: Jinming Huang, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/453,855

(22) Filed: Jun. 26, 2019

(65) Prior Publication Data

US 2020/0410750 A1   Dec. 31, 2020

(51) Int. Cl.
| | |
|---|---|
| *G06K 9/00* | (2006.01) |
| *G06T 17/05* | (2011.01) |
| *G06T 7/55* | (2017.01) |
| *H04N 7/18* | (2006.01) |
| *G01S 13/86* | (2006.01) |
| *G01S 13/89* | (2006.01) |
| *G01S 13/42* | (2006.01) |

(52) U.S. Cl.
CPC ............ *G06T 17/05* (2013.01); *G01S 13/426* (2013.01); *G01S 13/867* (2013.01); *G01S 13/89* (2013.01); *G06T 7/55* (2017.01); *H04N 7/183* (2013.01); *G06T 2207/10028* (2013.01); *G06T 2207/10044* (2013.01)

(58) Field of Classification Search
CPC combination set(s) only.
See application file for complete search history.

(56) References Cited

U.S. PATENT DOCUMENTS

| | | | |
|---|---|---|---|
| 5,629,988 | A | 5/1997 | Burt et al. |
| 6,252,974 | B1 | 6/2001 | Martens et al. |
| 6,483,536 | B2 | 11/2002 | Aoyama |

(Continued)

FOREIGN PATENT DOCUMENTS

| | | |
|---|---|---|
| CN | 102508246 A | 6/2012 |
| CN | 104796612 B | 12/2017 |

(Continued)

OTHER PUBLICATIONS

Atashagah et al., "An integrated virtual environment for feasibility studies and implementation of aerial MonoSLAM," Virtual Reality, vol. 16, Issue 3, Sep. 2012, 34 pp.

(Continued)

*Primary Examiner* — Md N Haque
(74) *Attorney, Agent, or Firm* — Shumaker & Sieffert, P.A.

(57) ABSTRACT

In some examples, a system includes a range sensor configured to receive signals reflected from objects in an environment and generate two or more successive scans of the environment at different times. The system also includes a camera configured to capture two or more successive camera images of the environment, wherein each of the two or more successive camera images of the environment is captured by the camera at a different location within the environment. The system further includes processing circuitry configured to generate a three-dimensional map of the environment based on the two or more successive scans and the two or more successive camera images.

20 Claims, 7 Drawing Sheets

(56) References Cited

U.S. PATENT DOCUMENTS

| | | | |
|---|---|---|---|
| 7,042,389 B2 | 5/2006 | Shirai | |
| 7,756,298 B2 | 7/2010 | Miyahara et al. | |
| 8,619,082 B1* | 12/2013 | Ciurea | G02B 27/0075 |
| | | | 345/427 |
| 8,912,946 B2 | 12/2014 | Yanagihara et al. | |
| 9,870,624 B1* | 1/2018 | Narang | G06T 7/55 |
| 10,029,804 B1 | 7/2018 | Chamerlain et al. | |
| 10,552,973 B2* | 2/2020 | Zou | H04N 13/239 |
| 2004/0178945 A1 | 9/2004 | Buchanan | |
| 2015/0264332 A1* | 9/2015 | McKay | G01S 7/4808 |
| | | | 348/46 |
| 2016/0070265 A1 | 3/2016 | Liu et al. | |
| 2016/0109566 A1 | 4/2016 | Liu et al. | |
| 2017/0019658 A1 | 1/2017 | Lee | |
| 2018/0232947 A1 | 8/2018 | Nehmadi et al. | |
| 2018/0246200 A1 | 8/2018 | Goossen et al. | |
| 2018/0318644 A1 | 11/2018 | Forsgren | |
| 2018/0356526 A1 | 12/2018 | Wang et al. | |
| 2019/0077007 A1* | 3/2019 | Mallinson | G05D 1/0274 |
| 2019/0113610 A1 | 4/2019 | Vacanti et al. | |

FOREIGN PATENT DOCUMENTS

| | | |
|---|---|---|
| JP | 4830958 B2 | 12/2011 |
| JP | 5051493 B2 | 10/2012 |
| JP | 5558440 B2 | 7/2014 |
| JP | 5651642 B2 | 1/2015 |
| WO | 2007015631 A1 | 2/2007 |

OTHER PUBLICATIONS

Wei et al., "LiDAR and Camera Detection Fusion in a Real-Time Industrial Multi-Sensor Collision Avoidance System," MDPI, Journal of Electronics, vol. 7, Issue 84, May 30, 2018, 32 pp.

Ellstrom et al., "Targetless calibration for vehicle mounted cameras—in planar motion using visual odometry," Department of Electrical Engineering—Chalmers University of Technology, Jun. 2018, 58 pp.

Bi et al., "A New Method of Target Detection Based on Autonomous Radar and Camera Data Fusion," SAE International Technical Paper, Automotive Sensors Group, Sep. 23, 2017, 8 pp.

Zhou et al., "DeepTAM: Deep Tracking and Mapping," European Conference on Computer Vision, ECCV, Sep. 8-14, 2018, 25 pp.

Hosni et al., "Fast Cost-Volume Filtering for Visual Correspondence and Beyond," IEEE Transactions on Pattern Analysis and Machine Intelligence, vol. 35, No. 2, Feb. 2013, 8 pp.

U.S. Appl. No. 16/169,879, by Honeywell International, Inc. (Inventor: Jahagirdar), filed Oct. 24, 2018.

Search Report from counterpart European Application No. 20181777.2, dated Oct. 13, 2020, 14 pp.

* cited by examiner

DENSE MAPPING USING RANGE SENSOR MULTI-SCANNING AND MULTI-VIEW GEOMETRY FROM SUCCESSIVE IMAGE FRAMES

TECHNICAL FIELD

This disclosure relates to three-dimensional mapping.

BACKGROUND

Outdoor three-dimensional reconstruction is useful for many applications, such as autonomous navigation, localization for airborne vehicles, mapping, obstacle avoidance, and many other applications. However, three-dimensional reconstruction can be challenging because of the large scales of three-dimensional maps, unshaped features in the maps, and bad illumination conditions. Creating fully automatic and real-time modeling processes with high-quality results pose difficulty because the processes of acquiring, storing, and matching data are costly both in terms of memory and time.

Vision-based approaches for three-dimensional reconstruction have relatively low cost and high spatial resolution. However, vision-based simultaneous location and mapping (vSLAM) solutions for scene reconstruction suffer from scale factor cumulative drift and loop closure problems. The output of a vSLAM process may be inaccurate due to poor image quality, which can result from external factors such as poor illumination, lack of texture, occlusions, or moving objects.

Millimeter-wave (MMW) radar-based solutions offer advantages of higher reliability independent of the illumination and weather conditions. However, MMW radars fail to recognize the elevation, shape, and size of the target. Moreover, the depth output from MMW radars is very sparse.

Lidar-based solutions provide a large number of accurate three-dimensional points for scene reconstruction. However, the alignment of a large amount of data requires heavy processing algorithms that can be memory- and time-consuming. Reconstructed scenes using point cloud-based methods generally have an unstructured representation and could not be directly represented as connected surfaces. Compared with radar, lidar is generally more expensive and is affected by external illumination and weather conditions (e.g., rain drops, dust particles, and extreme sunlight), which can result in noisy measurements.

SUMMARY

In general, this disclosure relates to systems, devices, and techniques for using successive scans performed by a range sensor and successive images captured by a camera to generate a three-dimensional map of an environment. A system can generate a dense three-dimensional map of the environment based on estimates of the depths of objects in the environment. The system can fuse range-sensor scans and camera images to generate the three-dimensional map and can continually update the three-dimensional map based on new acquired scans and camera images.

In some examples, a system includes a range sensor configured to receive signals reflected from objects in an environment and generate two or more successive scans of the environment at different times. The system also includes a camera configured to capture two or more successive camera images of the environment, wherein each of the two or more successive camera images of the environment is captured by the camera at a different location within the environment. The system further includes processing circuitry configured to generate a three-dimensional map of the environment based on the two or more successive scans and the two or more successive camera images.

In some examples, a method includes receiving, by processing circuitry from a range sensor, two or more successive scans of an environment performed by the range sensor at different times, wherein the two or more successive scans represent information derived from signals reflected from objects in the environment. The method also includes receiving, by the processing circuitry, two or more successive camera images of the environment captured by the camera, wherein each of the two or more successive camera images of the object is captured by the camera at a different location within the environment. The method further includes generating, by the processing circuitry, a three-dimensional map of the environment based on the two or more successive scans and the two or more successive camera images.

In some examples, a device includes a computer-readable medium having executable instructions stored thereon, configured to be executable by processing circuitry for causing the processing circuitry to receive, from a range sensor, two or more successive scans of an environment performed by the range sensor at different times, wherein the two or more successive scans represent information derived from signals reflected from objects in the environment. The device also includes instructions for causing the processing circuitry to receive, from a camera, two or more successive camera images of the environment, wherein each of the two or more successive camera images is captured by the camera at a different location within the environment. The device further includes instructions for causing the processing circuitry to generate a three-dimensional map of the environment based on the two or more successive scans and the two or more successive camera images.

The details of one or more examples of the disclosure are set forth in the accompanying drawings and the description below. Other features, objects, and advantages will be apparent from the description, drawings, and claims.

DETAILED DESCRIPTION

Various examples are described below for generating a three-dimensional map of an environment by combining camera images with successive scans performed by a range sensor. To generate the three-dimensional map, a system can generate a multi-view geometry of the environment based on sequential images captured by a camera and based on successive scans performed by a range sensor. The system can combine the multi-view geometry and the successive range sensor scans to form a dense map of the environment surrounding the range sensor and the camera. As the system generates the three-dimensional map, the system takes into account the translational movement and rotational movement of the range sensor and the camera in the three-dimensional environment.

The system can perform visual simultaneous location and mapping (vSLAM) using the sequential camera images to form a multi-view geometry as the camera moves throughout the three-dimensional environment. The system can determine the depth estimates for objects in the three-dimensional space based on the reflections received by the range sensor. The system can use the range sensor returns as a constraint to fine tune the depth estimates from the vSLAM process. As the system receives new camera images and return information from the range sensor, the system can update the dense map of the environment.

In contrast to a system that performs a one-time fusion of one image and one scan performed by a range sensor, a system that combines multi-view and multi-scanning can form and update a dense point cloud of the surrounding environment. The system can rely on the complementarity of the range sensor (e.g., depth detection capability and the robustness to environmental conditions) and the camera (e.g., high spatial resolution and high angular resolution).

The system can use the dense point cloud to track objects within the environment and/or to determine the positions of the camera and range sensor within the environment. The three-dimensional map can be used for obstacle detection and terrain objects avoidance and landing zone clearance for pilot-in-the-loop as well as autonomous navigation and landing operations.

Figure 1:
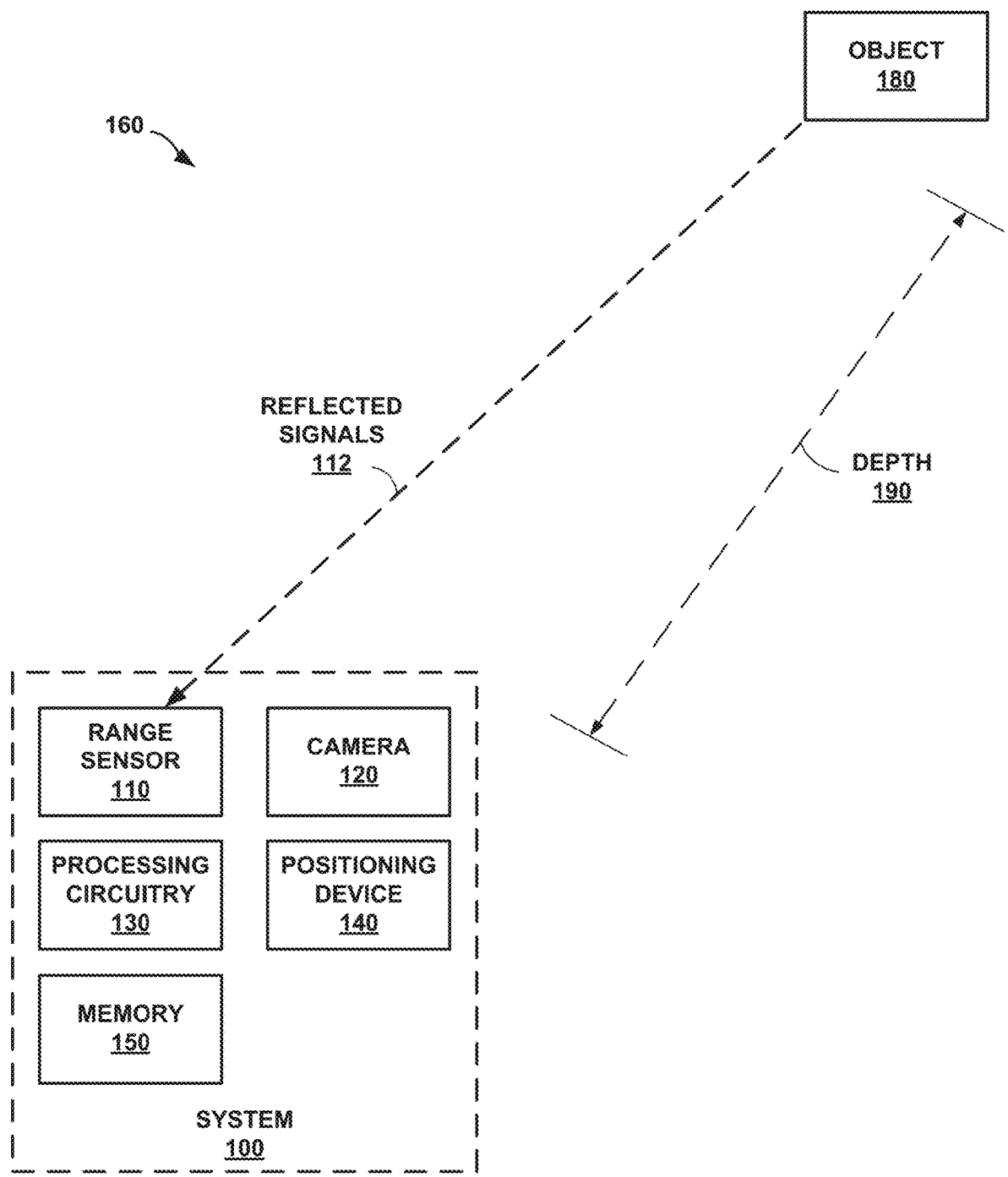
FIG. 1 is a conceptual block diagram of a system including a range sensor and a camera, in accordance with some examples of this disclosure.

FIG. 1 is a conceptual block diagram of a system 100 including a range sensor 110 and a camera 120, in accordance with some examples of this disclosure. System 100 includes range sensor 110, camera 120, processing circuitry 130, positioning device 140, and memory 150. System 100 may be mounted on a vehicle that moves throughout a three-dimensional environment, such that range sensor 110 and camera 120 may have translational movement and rotational movement. Range sensor 110 and camera 120 can each move with six degrees of freedom (e.g., pitch, roll, and yaw), as well as translational movement.

System 100 may be mounted on, attached to, and/or built-in to vehicle or a non-vehicle mobile object. In some examples, system 100 can be mounted on an aircraft such as an airplane, a helicopter, or a weather balloon or a space vehicle such as a satellite or spaceship. In yet other examples, system 100 can be mounted on a land vehicle such as an automobile or a water vehicle such as a ship or a submarine. System 100 can be mounted on a manned vehicle or an unmanned vehicle, such as a drone, a remote-control vehicle, or any suitable vehicle without any pilot or crew on board. In some examples, part of system 100 (e.g., range sensor 110 and camera 120) may be mounted on a vehicle and another part of system 100 (e.g., processing circuitry 130) may be outside of the vehicle.

Range sensor 110 transmits signals into environment 160 and receives reflected signals 112 from environment 160. The signals transmitted by range sensor 110 can reflect off of object 180 and return to range sensor 110. Processing circuitry 130 can determine the distance (e.g., depth 190) from range sensor 110 to object 180 by processing reflected signals 112 received by range sensor 110. Range sensor 110 may include a radar sensor (e.g., millimeter wave radar and/or phased-array radar), a lidar sensor, and/or an ultrasound sensor. Example details of range sensors can be found at commonly assigned U.S. Patent Application Publication No. 2018/0246200, filed on Nov. 9, 2017, and entitled "Integrated Radar and ADS-B," and commonly assigned U.S. Patent Application Publication No. 2019/0113610, filed on Feb. 5, 2018, and entitled "Digital Active Phased Array Radar," the entire contents of which are incorporated herein. For example, range sensor 110 may include a radar sensor configured to use electronic scanning to perform a full scan of the field of view in less than five seconds or, in some examples, less than three seconds.

Range sensor 110 may be capable of determining range or distance (e.g., depth 190 to object 180) at a higher accuracy than camera 120. Measurements of depth 190 to object 180 obtained by range sensor 110 based on reflected signals 112 may have a constant range error with increasing distance. As described in further detail below, processing circuitry 130 can determine a first estimate of depth 190 based on the images captured by camera 120. Then, processing circuitry 130 can determine a second estimate of depth 190 based on reflected signals 112 received by range sensor 110 and use the second estimate to supplement the first estimate of depth 190 based on the camera images.

Range sensor 110 can perform a scan by transmitting signals into part or all of environment 160 and receiving reflected signals from the objects in environment. Range sensor 110 can perform successive scans by transmitting signals across part or all of environment 160 for a first scan and then repeating the process by transmitting signals across part or all of environment 160 for a second scan.

Camera 120 captures successive or sequential images of environment 160 and object 180 as camera 120 moves within environment 160. Thus, camera 120 captures images at different locations within environment 160 and provides the captured images to processing circuitry 130 for use in generating a three-dimensional map and/or to memory 150 for storage and later use by processing circuitry 130 to map environment 160. Camera 120 may include a visual camera and/or an infrared camera. Processing circuitry 130 can store the location and pose information (e.g., translation and rotation) of camera 120 for each image captured by camera 120. Processing circuitry 130 can use the location and pose information to generate the three-dimensional map of environment 160. Camera 120 may have a lighter weight and lower power consumption than range sensor 110. Moreover, camera 120 may be capable of sensing angular information with a higher accuracy, as compared to range sensor 110.

Processing circuitry 130 can perform vSLAM using the images captured by camera 120 to simultaneously map environment 160 and track the position of system 100. vSLAM is an image-based mapping technique that uses a moving camera and multi-view geometry. vSLAM includes simultaneously tracking the movement of system 100 and mapping environment 160. In the vSLAM method, processing circuitry 130 can use the estimates of depths of objects in environment 160 to track the position of system 100 within environment 160. During the tracking step, processing circuitry 130 may be configured to use pose information from inertial sensors to track the position of system within environment 160. Processing circuitry 130 then uses the positions, orientations, and poses of camera 130 for each image to generate the map of environment 160. During the mapping step, processing circuitry 130 can build a three-dimensional map by extracting key points from multiple images fused with the movement information from the tracking step.

Unlike other systems that perform vSLAM using only images, system 100 and processing circuitry 130 can use successive multi-scanning from range sensor 110 and multi-view geometry from sequential image frames captured by camera 120 to compute the pixel-wise uncertainty confidence for a spatial cost volume given the rotation and translation of camera 120. Processing circuitry 130 can also fine tune the vSLAM depth estimation with the depth constraint profile generated from the multi-scanning of range sensor 110 to improve the depth accuracy.

Processing circuitry 130 may be configured to warp the returns from successive scans by range sensor 110 onto the middle view of the scanning with the known camera pose. Processing circuitry 130 can compare camera images and/or range-sensor images by warping one view to another view. Warping the returns from successive scans onto the middle view of the scanning based on the known pose(s) of camera 120 can improve the points density surrounding the middle view. Processing circuitry 130 may be configured to compute the spatial cost volume adaptively spaced in the depth range based on the pixel-wise uncertainty confidence and to utilize the depth profile output from range sensor 110 to calibrate the vSLAM depth output and improve the density and accuracy of the depth measurement based on the vSLAM-generated map.

Processing circuitry 130 receives return information based on reflected signals 112 from range sensor 110 and receives images from camera 120. Processing circuitry 130 can generate range-sensor images based on the return information received from the range sensor 110. The range-sensor images may each include a rough map of environment 160 that includes depth information for objects in environment 160. Processing circuitry 130 can generate a multi-view geometry based on the images received from camera 120 and combine the multi-view geometry with the rough map of environment 160.

Processing circuitry 130 can match points in the range-sensor images and the camera images to determine the depth of objects in environment 160. For example, processing circuitry 130 can identify keypoints in the camera images and then detect the corresponding points in the range-sensor images. Processing circuitry 130 can extract features from the camera images and match the extracted features to points in the range-sensor images. Example details of keypoint detection and matching can be found in commonly assigned U.S. patent application Ser. No. 16/169,879, filed on Oct. 24, 2018, and entitled "Applying an Annotation to an Image Based on Keypoints," the entire contents of which are incorporated herein.

Processing circuitry 130 may be mounted on a vehicle with the other components of system 100, and/or processing circuitry 130 can be located outside of the vehicle. For example, if range sensor 110 and camera 120 are mounted on an unmanned aerial vehicle (UAV), processing circuitry 130 can be located on the UAV and/or in a ground system. System 100 can perform scans and capture images of environment during an inspection. After the inspection, the UAV can send the data to a ground-based computer including processing circuitry 130 that generates the three-dimensional map of environment 160. However, it is also possible for processing circuitry 130 to be co-located with range sensor 110 and camera 120 onboard the UAV.

Whether processing circuitry 130 is co-located or located remotely from range sensor 110 and camera 120, processing circuitry 130 can generate a three-dimensional map of environment 160 as a vehicle moves throughout environment 160. Processing circuitry 130 can generate a travel path through environment 160 for the vehicle based on the three-dimensional map. Processing circuitry 130 can navigate the vehicle and control the movements of the vehicle based on the travel path that is generated as the vehicle is moving along the travel path.

Positioning device 140 determines the position or location of system 100 and provides this information to processing circuitry 130. Positioning device 140 may include satellite navigation equipment such as a Global Navigational Satellite System (GNSS) configured to receive positioning signals from satellites and other transmitters. One example of a GNSS is a Global Positioning System (GPS). Positioning device 140 may be configured to deliver the received positioning signals to processing circuitry 130, which may be configured to determine the position of system 100. Processing circuitry 130 can determine the positions of range sensor 110 and camera 120 based on the positioning data from positioning device 140. Processing circuitry 130 can also determine the positions and orientation based on information from a navigation system, a heading system, a gyroscope, an accelerometer, and/or any other device for determining the orientation and heading of a moving object. For example, system 100 may include an inertial system with one or more gyroscopes and accelerometers.

Memory 150 stores a three-dimensional map of environment 160 generated by processing circuitry 130. In some examples, memory 150 may store program instructions, which may include one or more program modules, which are executable by processing circuitry 120. When executed by processing circuitry 120, such program instructions may cause processing circuitry 120 to provide the functionality ascribed to it herein. The program instructions may be embodied in software and firmware. Memory 150 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Environment 160 includes object 180 and other objects not shown in FIG. 1. As processing circuitry 130 generates and updates the three-dimensional map, system 100 can move throughout environment 160. In addition, the objects in environment 160 can move as range sensor 110 and camera 120 are gathering data. For example, system 100 can be mounted on an unmanned aerial vehicle and used to inspect a structure in environment 160. System 100 can perform scans and capture images of environment 160 during the inspection, and processing circuitry 130 can generate the three-dimensional map of environment 160 during or after the inspection.

Object 180 is located at depth 190 from system 110, but the distance from range sensor 110 to object 180 may be different than the distance from camera 120 to object 180. Thus, processing circuitry 130 can use the locations and orientations of each of range sensor 110 and camera 120 to determine the location of object 180 within environment 160.

Another system may perform a one-time fusion of a single scan performed by a range sensor and a single image captured by a camera. This other system can determine the location of an object using the one-time fusion to, for example, avoid a collision between a vehicle and the object. The system can identify the object in an image and then find the object in scan information to determine the distance between the object and the vehicle. To determine an updated location of the object, the system can later perform another one-time fusion of another camera image and another scan performed by the range sensor. The system can identify the object in the later image and then find the object in the scan information. The system cannot use one-time fusion of images and scans to build and update a dense map of the environment. Moreover, the system cannot use the one-time fusion to continually determine the position of the system within the environment.

In accordance with the techniques of this disclosure, processing circuitry 130 can generate a dense map of environment 160 based on two or more successive scans performed by range sensor 110 and two or more images captured by camera 120. Using the scans received from range sensor 110, processing circuitry 130 can determine accurate estimates of the depths of objects in environment 160. Using the images received from camera 120, processing circuitry 130 can determine angular information for the objects in environment 160. By using successive scans and successive camera images, processing circuitry 130 can generate and update a dense three-dimensional map of environment 160.

Processing circuitry 130 may be capable of generating a high-resolution map of environment 160. For example, system 100 may have a field of view of sixty degrees in the horizontal dimension and forty-five degrees in the vertical dimension. The resolution of range sensor 110 may be less than one-tenth of one degree, such that processing circuitry 130 generates a three-dimensional map of depth values with 640 pixels in the horizontal dimension and 480 pixels in the vertical dimension. This example is for illustrative purposes only, and other examples are possible, including examples with a wider field of view and/or higher angular resolution.

System 100 can be implemented in a variety of applications. In examples in which range sensor 110 includes a phased-array radar, processing circuitry 130 can perform sensor fusion for the radar returns received by range sensor 110 and images captured by camera 120. Processing circuitry 130 can also perform obstacle detection and avoidance for a UAV operating beyond visual line-of-sight. The enhanced depth estimation accuracy of system 100 is useful for determining the depth of obstacles and preventing a collision with the obstacles. In addition, system 100 can provide navigation when GPS is not functional (e.g., in a GPS-denied area).

In examples in which GPS, GNSS, or cellular service is be fully available or reliable, a UAV or an urban air mobility (UAM) can use the techniques of this disclosure for internal guidance during take-off and landing. In some examples, a UAV can use a deep-learning-enabled radar augmented vision system to generate an estimate of depth based on a one-time inference without considering the multi-view geometry from camera images. A UAV can also use Dense Tracking and Mapping (DTAM) with a single camera. This disclosure describes a new method for dense depth prediction by utilizing successive radar multi-scanning and multi-view geometry from sequential image frames to compute the pixel-wise uncertainty confidence for a spatial cost volume given a set of rotational and translational movement of camera 120. Processing circuitry 130 can fine tune the vSLAM depth estimation using the multi-scanning by range sensor 110 to improve depth density and estimation accuracy.

Figure 2:
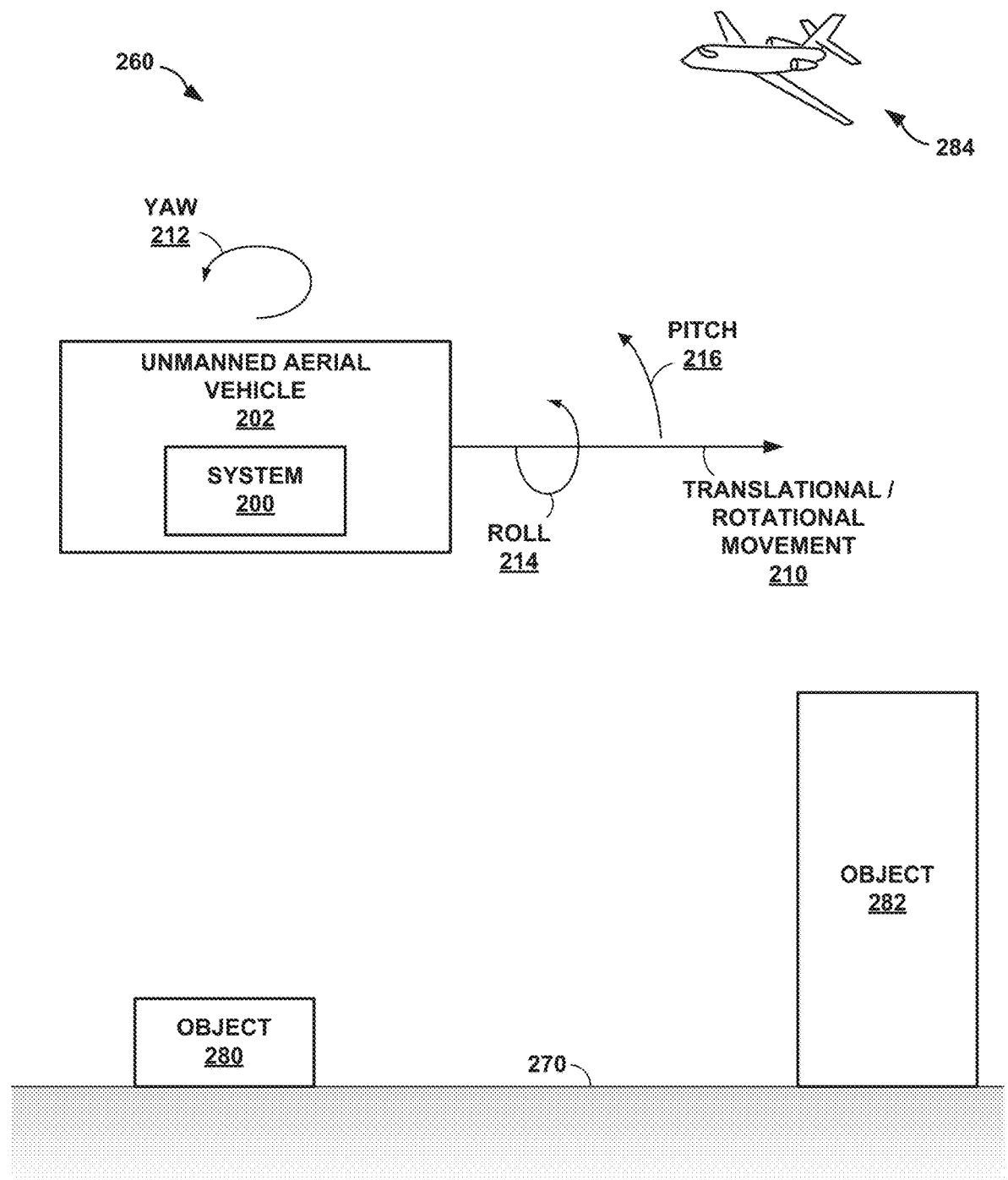
FIG. 2 is a conceptual block diagram of an unmanned aerial vehicle including a system for generating a three-dimensional map of an environment, in accordance with some examples of this disclosure.

FIG. 2 is a conceptual block diagram of a UAV 202 including a system 200 for generating a three-dimensional map of an environment 260, in accordance with some examples of this disclosure. System 200 includes processing circuitry configured to determine the position and orientation of system 200 based translational and rotational movement 210, yaw 212, roll 214, and pitch 216. System 200 has six degrees of freedom because the three-dimensional mapping process accounts for the yaw, roll, and pitch for the range sensor and the yaw, roll, and pitch for the camera.

System 200 can determine depth estimates for objects 280 and 282 and vehicle 284 within environment 260. Objects 280 and 282 are ground-based objects, such as a building, a tree or other vegetation, terrain, light poles, power poles, and/or cellular transmission towers. Vehicle 284 is an airborne object depicted as an airplane, but vehicle 284 can also be a helicopter, a UAV, and/or a weather balloon. In some examples, environment 260 can include other objects such as birds. System 200 is configured to generate a three-dimensional map of the positions of the objects in environment 260 including objects 280 and 282, vehicle 284, and ground surface 270.

Figure 3:
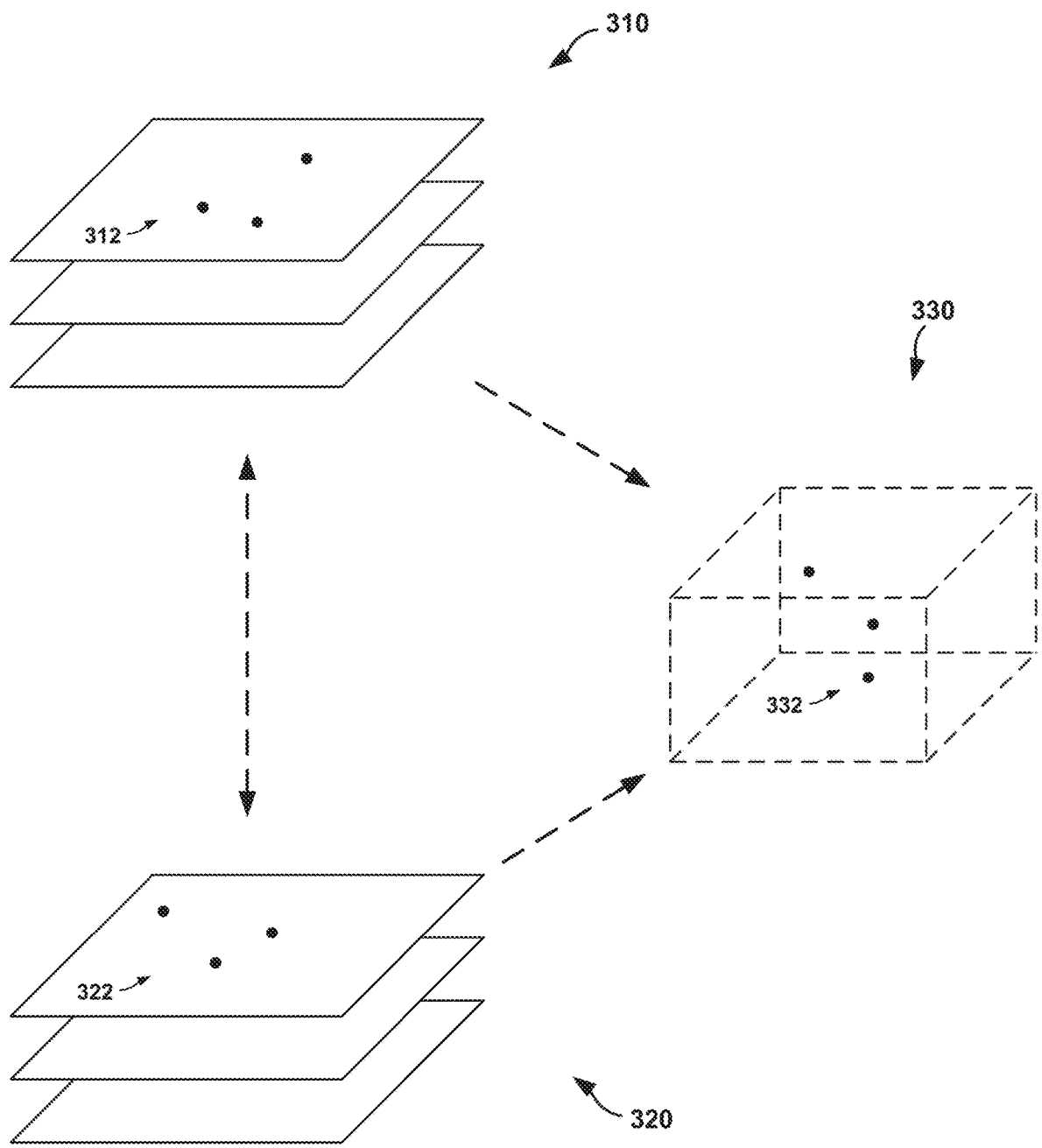
FIG. 3 is a diagram illustrating the generation of a three-dimensional map based on multi-view geometry and successive scans by a range sensor, in accordance with some examples of this disclosure.

FIG. 3 is a diagram illustrating the generation of a three-dimensional map 330 based on multi-view geometry 320 and successive scans 310 by a range sensor, in accordance with some examples of this disclosure. Processing circuitry 130 of system 100 shown in FIG. 1 can identify points 312 in successive scans 310. Processing circuitry 130 can also identify points 322 in the successive images of multi-view geometry 320. Processing circuitry 130 may be configured to match points 312 with point 322 and use the matched points to determine a refined depth estimate for an object in the environment.

Processing circuitry 130 is configured to generate three-dimensional map 330 based on successive scans 310 and multi-view geometry 320. Processing circuitry 130 can determine the locations of points 332 within three-dimensional map 330 based on the locations of points 312 within successive scans 310 and the locations of points 322 within multi-view geometry 320. Multi-view geometry 320 can provide smooth depth estimates, and successive scans 310 can provide a constraint for the depth estimates based on multi-view geometry 320. Processing circuitry 130 can use adaptive range slice, rather than fixed range slice, to adjust the depth estimate in the three-dimensional map.

Based on successive scans 310, processing circuitry 130 can determine depth estimate for the objects within environment 160. However, the depth estimates based on successive scans 310 may be sparse and may have errors due to noise. Moreover, there may be little or no relevance between the data from each of successive scans 310, especially for a range sensor with a slow scan speed and for a vehicle moving at a fast speed. However, when paired with multi-view geometry 320 based on images captured by camera 120, successive scans 310 can be used to generate a dense three-dimensional map. The three-dimensional mapping process described herein goes beyond a one-time fusion of an image captured by camera 120 and a scan performed by range sensor 110 to combine successive scans 310 and sequential image frames to generate the dense three-dimensional map.

Figure 4:
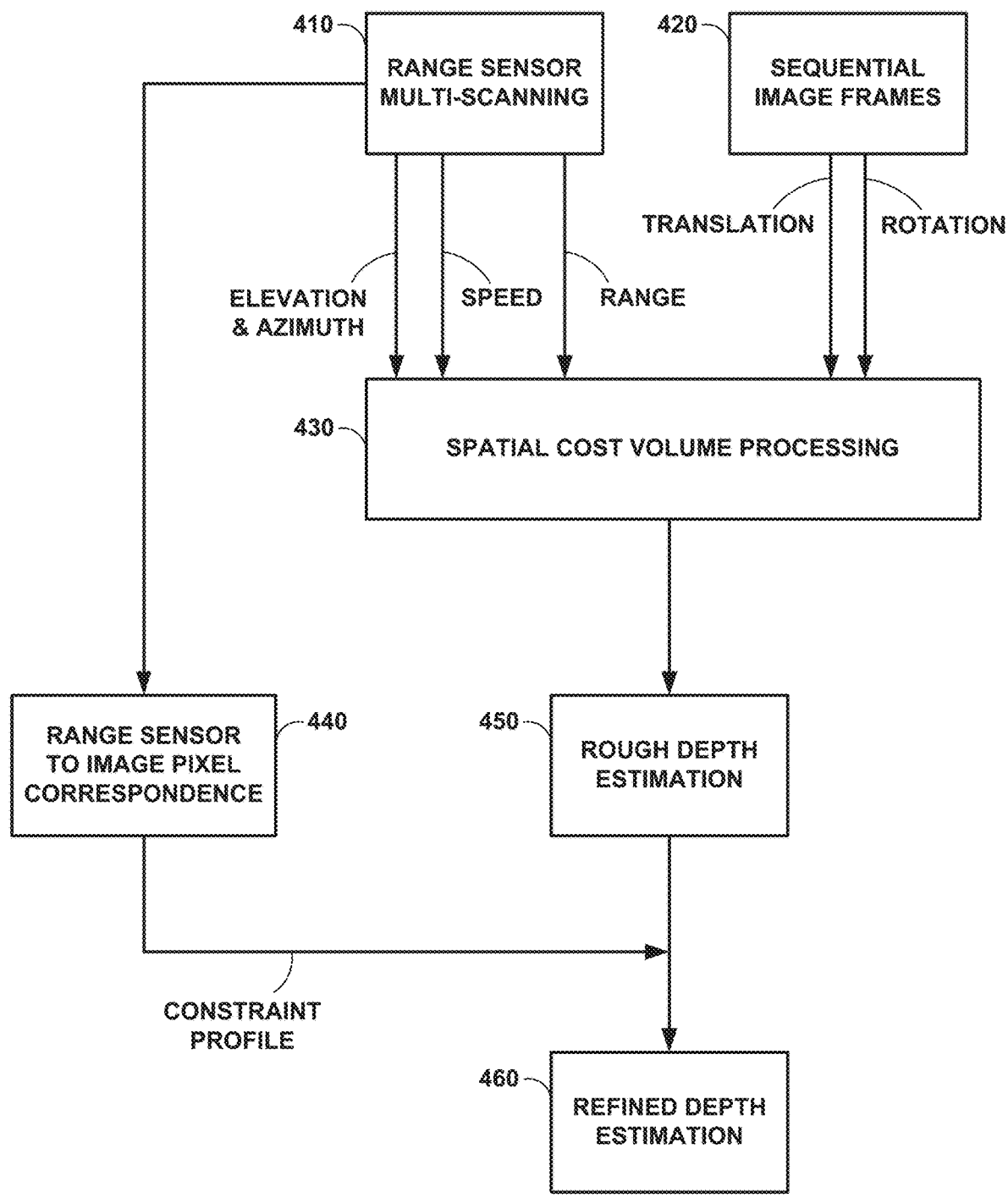
FIG. 4 is a flow diagram for determining a refined depth estimation based on spatial cost volume, in accordance with some examples of this disclosure.

FIG. 4 is a flow diagram for determining a refined depth estimation based on spatial cost volume, in accordance with some examples of this disclosure. The example process of FIG. 4 is described with reference to system 100 shown in FIG. 1, although other components may exemplify similar techniques. Although FIG. 4 is described as including processing circuitry 130 performing spatial cost volume processing, processing circuitry 130 can use a conditional (Markov) random field model or an alpha matte in addition to or as an alternative to using a spatial cost volume.

In the example of FIG. 4, range sensor 110 performs multi-scanning (410). Range sensor 110 receives reflected signals 112 as part of the successive scans and send information to processing circuitry 130. The information can include elevation data, azimuth data, speed data, and range data. For example, range sensor 110 can send data indicating the elevation angle of object 180 (e.g., the angle from range sensor 110 to object 180 relative to horizontal), the azimuth angle of object 180, the speed of object 180 (e.g., the Doppler speed of object 180), and depth 190.

In the example of FIG. 4, camera 120 captures sequential image frames (420). Camera 120 send the captured images to processing circuitry 130 along with translational and rotational movement information. Additionally or alternatively, processing circuitry 130 can receive the translational and rotational movement information from an inertial sensor.

In the example of FIG. 4, processing circuitry 130 performs spatial cost volume processing (430). Processing circuitry 130 can perform the spatial cost volume processing by determining a multi-view geometry based on accumulated measurements from multiple sensors (e.g., range sensor 110 and camera 120). For example, processing circuitry 130 can perform the spatial cost volume processing based on multi-scanning from a millimeter wave (MMW) radar and multi-view geometry from image sequences with the corresponding rotation and translation of camera 120.

Processing circuitry 130 may be configured to feed the Fast Fourier Transformation (FFT) range bins and angle bins as a spatial feature. The range bins and the angle bins represent the returned power of the reflected signals received by range sensor 110 for each azimuth and elevation angle in environment 160. Processing circuitry 130 can also utilize the multi-view geometry to warp successive range-sensor scans onto the middle scanning of range sensor 110 with the known pose of range sensor 110. Processing circuitry 130 can also compute the spatial cost volume adaptively spaced in the depth range based on the multi-view geometry and based on the pixel-wise uncertainty confidence. As described further below, processing circuitry 130 may be configured to utilize the depth output from range sensor 110 as a constraint to calibrate the vSLAM depth output and improve the density and accuracy of depth map measurement.

Example details of spatial cost volume processing can be found in "Fast Cost-Volume Filtering for Visual Correspondence and Beyond" by Asmaa Hosni et al., published in IEEE Transactions on Pattern Analysis and Machine Intelligence in February 2013, the entire contents of which is incorporated by reference herein. A spatial cost volume is a kind of a multi-view geometry where the space or environment is split into multiple pieces. Processing circuitry 130 can construct a spatial cost volume and warp new images to the same view as the previous images to obtain the spatial cost volume. Processing circuitry 130 can construct the spatial cost volume in an adaptive way where the range slice is adjusted based on the error. The spatial cost volume is similar to a four-dimensional model (e.g., space and time).

Processing circuitry 130 can use a first FFT applied to successive scans 310 to extract range information for the objects within environment 160. Processing circuitry 130 can use a second FFT to extract speed information based on the Doppler effect. Processing circuitry 130 can also use a third FFT to extract angle information for the objects within environment 160. Processing circuitry 130 can perform the second FFT using the output of the first FFT as an input. Processing circuitry 130 may then perform the third FFT using the output on the second FFT as an input.

In the example of FIG. 4, processing circuitry 130 corresponds points in the range sensor scans to pixels in the camera images (440). Processing circuitry 130 can identify the points in the range-sensor images and camera images using keypoint identification techniques. Processing circuitry 130 can generate a constraint profile based on matching the points in the range-sensor images and points in the camera images. Processing circuitry 130 can perform pixelwise matching using the direction or angle, the color information (e.g., red-green-blue information), and the range information.

In the example of FIG. 4, processing circuitry 130 determines a rough estimate of depth 190 for object 180 based on the spatial cost volume (450). In some examples, processing circuitry 130 can determine a rough estimate of the depth of all of the objects within environment 160. As part of determining the rough estimate of depth 190, processing circuitry 130 can calculate the depth error based on the depth range in the scene which can be split into multiple range slices.

The pixel-wise uncertainty for a spatial cost volume can be measured through the uncertainty of a generated depth map. Processing circuitry 130 can compute the pixel-level uncertainty for a spatial cost volume based on the translational and rotational movement of camera 120. There may be a sensor embedded in camera 120 that allows processing circuitry 130 to extract translation and orientation. Processing circuitry 130 can calculate the depth error based on the depth range in the scene, which can be split into multiple slices.

Three techniques for measuring the depth error are labeled as L1-rel, L1-inv, and Sc-inv. Processing circuitry 130 can measure L1-rel by absolute difference of depth value in log space averaged on a number of pixels to normalize the depth error. The difference of depth value can refer to the difference value between a predicted depth and ground truth depth. Processing circuitry 130 can measure L1-inv by the absolute difference of the reciprocal of the depth value in log space averaged on a number of pixels (n), which places more emphasis on the near depth value. Sc-inv is a scale invariant metric that allows processing circuitry 130 to measure the relationship between points in the scene, irrespective of the absolute global scale. Processing circuitry 130 may be configured to switch the depth error evaluation method based on the scene depth range to have a better reflection of the uncertainty in depth computation.

In the example of FIG. 4, processing circuitry 130 determines a refined estimate of depth 190 based on the range sensor to image pixel correspondence (460). The range sensor to image pixel correspondence can include matching points in the camera images to points in the range-sensor images, as described with respect to FIG. 3. Processing circuitry 130 may be configured to refine the depth based on constraint profile generated by processing circuitry 130 from the multi-scanning. The data from range sensor 110 becomes a secondary channel to constrain the multi-view geometry based on images captured by camera 120. Even without ground truth depth data, processing circuitry 130 can check temporal/spatial pixel consistency between range sensor 110 and camera 120 to calculate the depth estimation error.

Figure 5:
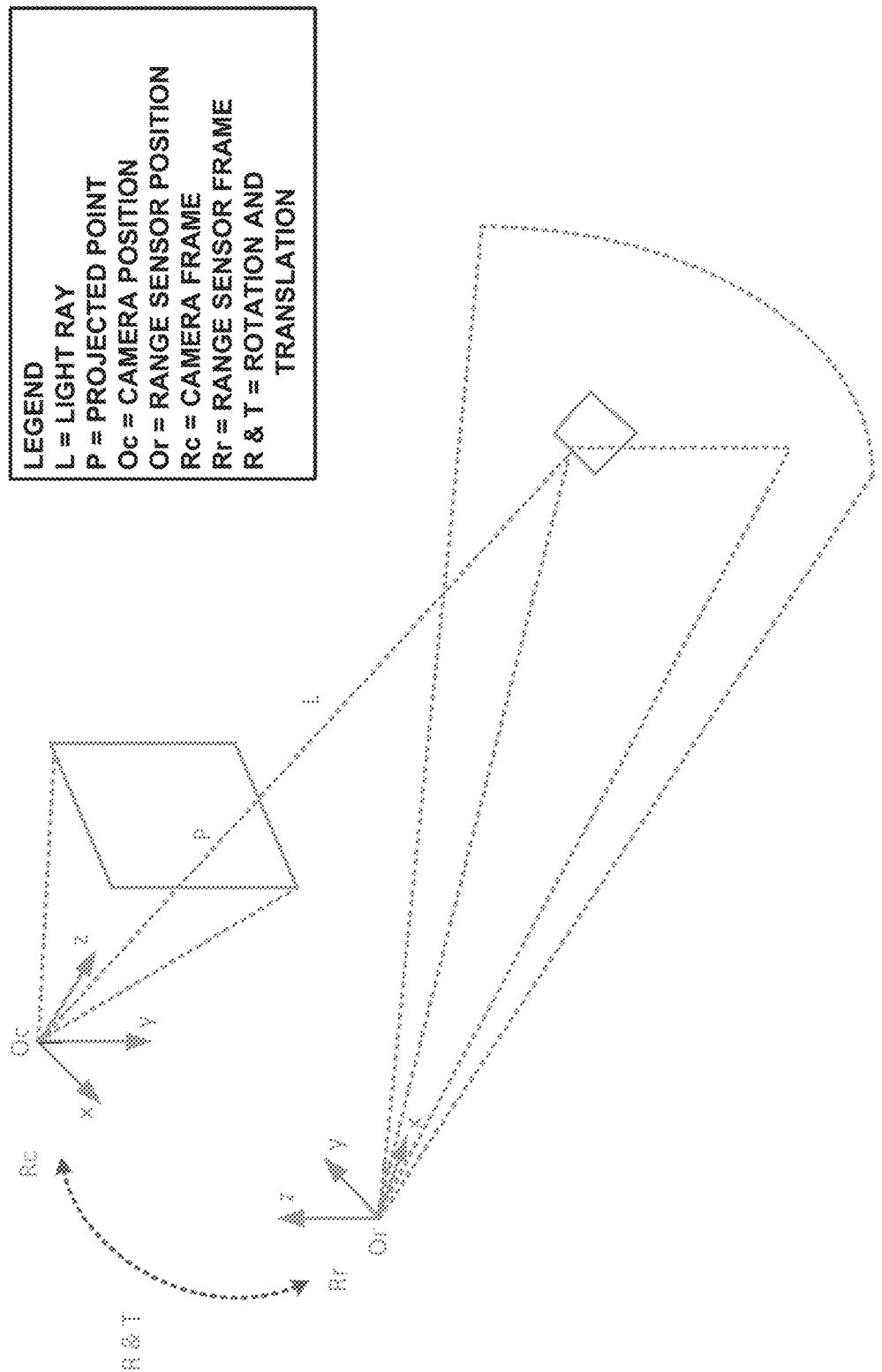
FIG. 5 is a diagram illustrating the geometry of a system that includes a range sensor and a camera, in accordance with some examples of this disclosure.

FIG. 5 is a diagram illustrating the geometry of a system that includes a range sensor and a camera, in accordance with some examples of this disclosure. Oc and Or are the relative positions of the camera and range sensor in the example geometry of FIG. 5. Rc and Rr are the camera frame and range-sensor frame, respectively. The range sensor data (azimuth and elevation) provides polar coordinates of the target. FIG. 5 shows the projected point on the camera plane is showed together with the horizontal range-sensor plane. Processing circuitry can determine the positions and orientations of the camera and the range sensor using GPS, an inertial system, a predetermined distance between the camera and the range sensor, and SLAM tracking algorithms.

The consistency error $C_{error}$ between the predicted depth from the camera multi-view geometry and the predicted depth from the range-sensor multi-scanning can be evaluated using Equation (1). In Equation (1), $C_{error}$ is spatial consistency error for selected pixels, N is defined as number of selected pixels for evaluation, $d_{i,j}^{camera}$ is evaluated with reference to depth output from range sensor multi-scanning and $d_{i,j}^{range}$ is evaluated with reference to depth output from camera multi-view geometry.

$$C_{error} = \frac{1}{N} \sum_{i,j} |d_{i,j}^{camera} - d_{i,j}^{range}| \qquad (1)$$

As shown in FIG. 5, the camera and the range sensor are not located at the same position. Even though both the camera and the range sensor may be mounted on the same vehicle, the camera and the range sensor can have different positions and different orientations. The generation of a three-dimensional map can be based on the relative position and orientation of the camera for each camera image captured by the camera. The generation of a three-dimensional map can be based on the relative position and orientation of the range sensor for each scan performed by the range sensor.

Figure 6:
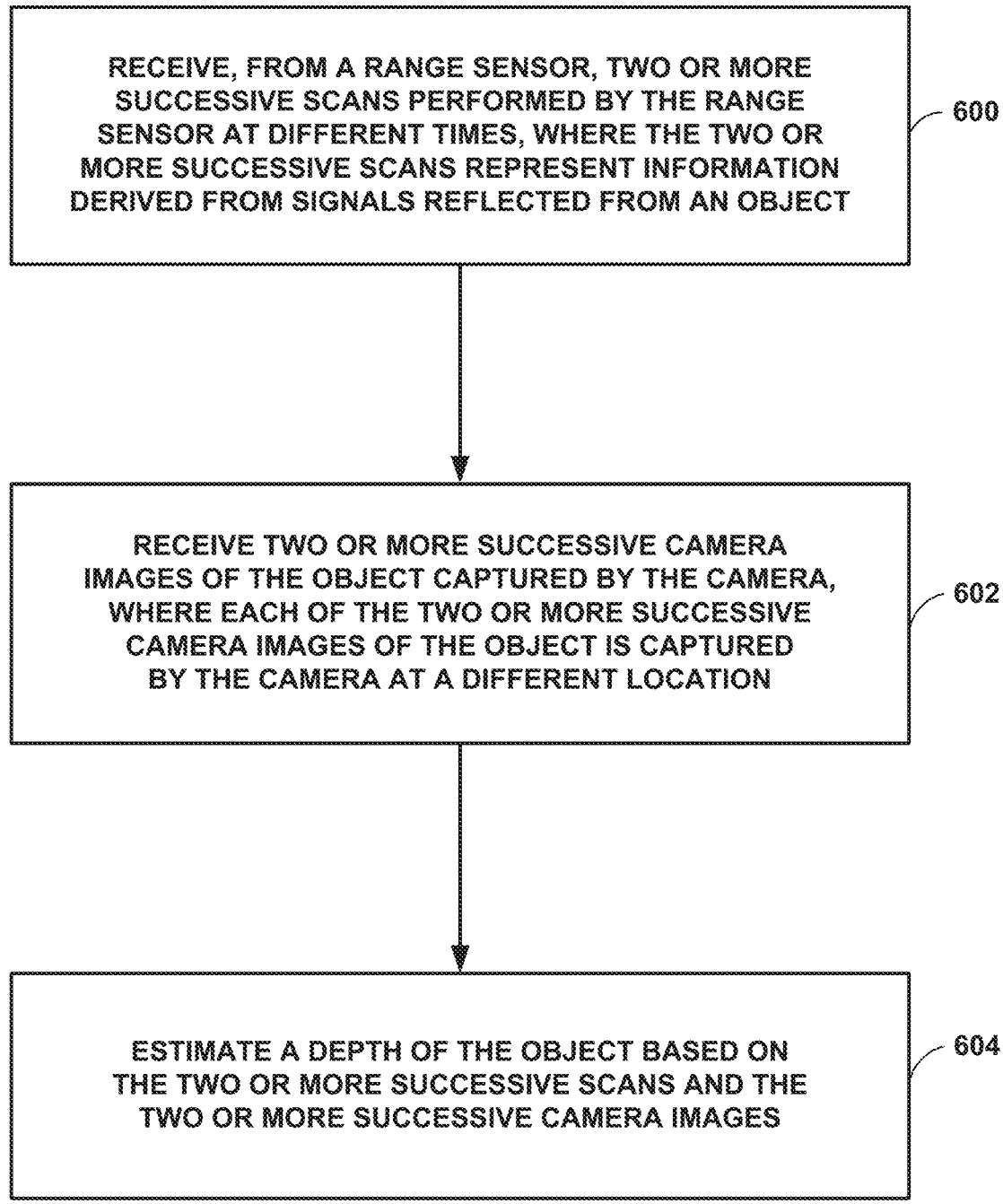
FIG. 6 is a flowchart illustrating an example process for generating a three-dimensional map of an environment based on successive images and successive scans, in accordance with some examples of this disclosure.

FIG. 6 is a flowchart illustrating an example process for generating a three-dimensional map of an environment based on successive images and successive scans, in accordance with some examples of this disclosure. The example process of FIG. 6 is described with reference to system 100 shown in FIG. 1, although other components may exemplify similar techniques.

In the example of FIG. 6, processing circuitry 130 receives from range sensor 110, two or more successive scans of environment 160 performed by range sensor 110 at different times, wherein the two or more successive scans represent information derived from signals reflected from objects in environment 160 (600). In examples in which range sensor 110 includes a radar sensor, range sensor 110 can perform a scan by transmitting radar signals into the field of view and receiving reflected radar signals. Processing circuitry 130 can use digital beamforming techniques to generate scan information at each elevation and azimuth within the field of view. Processing circuitry 130 can form and move a beam throughout the field of view while the radar sensor continuously transmits and receives signals to determine depths for each direction within the field of view. In examples in which range sensor 110 includes a lidar sensor, range sensor 110 can perform a scan by transmitting signals in each direction within the field of view.

In the example of FIG. 6, processing circuitry 130 receives two or more successive camera images of the environment captured by camera 120, wherein each of the two or more successive camera images of the object is captured by camera 120 at a different location within environment 160 (602). Processing circuitry 130 can use a keypoint detection algorithm such as an edge detection algorithm to identify keypoints in each image. Processing circuitry 130 can then match the keypoints across sequential images. Processing circuitry 130 can also determine the position and orientation of camera 120 for each image captured camera 120. Processing circuitry 130 can store the position and orientation of camera 120 to memory 150 for use in generating the three-dimensional map.

In the example of FIG. 6, processing circuitry 130 generates a three-dimensional map of environment 160 based on the two or more successive scans and the two or more successive camera images (604). Processing circuitry 130 can generate a dense three-dimensional map with a pixel resolution finer than one degree, finer than 0.5 degrees, finer than 0.2 degrees, or finer than 0.1 degrees in elevation and azimuth. Processing circuitry 130 can generate the dense three-dimensional map using rough depth estimates for objects in environment 160 based on successive images captured by camera 120. Processing circuitry 130 may generate refined depth estimates for the objects in environment 160 based on the successive scans performed by range sensor 110.

Figure 7:
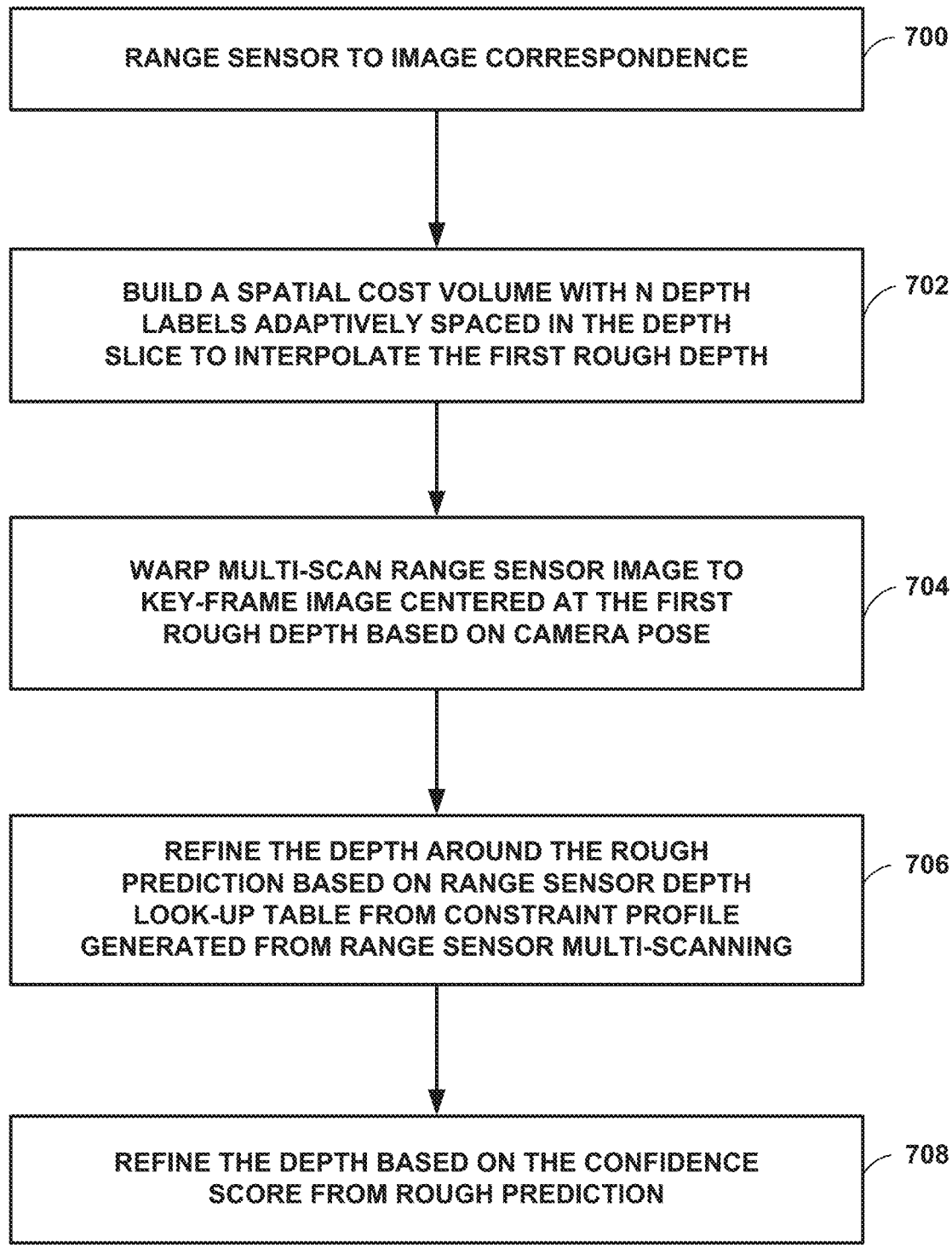
FIG. 7 is a flowchart illustrating an example process for multi-view geometry processing using successive images and successive scans, in accordance with some examples of this disclosure.

FIG. 7 is a flowchart illustrating an example process for multi-view geometry processing using successive images and successive scans, in accordance with some examples of this disclosure. The example process of FIG. 7 is described with reference to system 100 shown in FIG. 1, although other components may exemplify similar techniques.

In the example of FIG. 7, processing circuitry 130 performs range sensor to image correspondence (700). Using the geometric layout of range sensor 110 and camera 120, processing circuitry 130 can transform coordinates between range sensor images and camera images. Processing circuitry 130 can map the range sensor targets to image frame based on the coordinate transformation matrix.

In the example of FIG. 7, processing circuitry 130 builds a spatial cost volume with N depth labels adaptively spaced in the depth slice to interpolate the first rough depth (702). The spatial cost volume can be defined as a function SCV(x, d), where x stands for pixel position and the d stands for depth label. Processing circuitry 130 can compute the hyper parameters for constructing the spatial cost volume function from a set of images, camera poses, a set of range sensor images, and range sensor poses by a feature-learning-based solution.

In the example of FIG. 7, processing circuitry 130 warp multi-scan range sensor image to key-frame image centered at the first rough depth based on a pose of camera 120 (704). Warping multi-scan range sensor image to key-frame image centered at the first rough depth could be done using the relative pose and depth. The middle scanning of MMW range sensor with known pose could be selected as a reference to compute the spatial cost volume adaptively spaced in the depth range based on the multi-view geometry.

In the example of FIG. 7, processing circuitry 130 refines the depth around the rough prediction based on range sensor depth look-up table from constraint profile generated from range sensor multi-scanning (706). Processing circuitry 130 shapes the rough estimate using the depth output from the range-sensor multi-scan geometry as constraint profile to improve the depth accuracy. The range sensor-based odometry can be implemented through successive range sensor multi-scanning with known translation and rotation parameters. As the distance resolution for range sensor output is better than the distance resolution for vSLAM, the depth value generated from multi-scanning can be used as constraint file through loop-up table to remove the outlier of depth value from vSLAM.

In the example of FIG. 7, processing circuitry 130 refines the depth based on the confidence score from rough prediction (708). This is a kind of coarse-to-fine method. Processing circuitry 130 may be configured to extract the rough depth estimation and utilize the constraint profile to refine the depth prediction with better regularization. The confidence score could be calculated based on spatial consistency error for selected pixels.

The following numbered examples demonstrate one or more aspects of the disclosure.

Example 1. A method includes receiving, by processing circuitry from a range sensor, two or more successive scans of an environment performed by the range sensor at different times, where the two or more successive scans represent information derived from signals reflected from objects in the environment. The method also includes receiving, by the processing circuitry, two or more successive camera images of the environment captured by the camera, where each of the two or more successive camera images of the object is captured by the camera at a different location within the environment. The method further includes generating, by the processing circuitry, a three-dimensional map of the environment based on the two or more successive scans and the two or more successive camera images.

Example 2. The method of example 1, further including matching points in the two or more successive scans to points in the two or more successive camera images.

Example 3. The method of example 1 or example 2, where generating the three-dimensional map of the environment includes determining an estimate of the depth of a first object in the environment based on the two or more successive scans and the two or more successive camera images.

Example 4. The method of examples 1-3 or any combination thereof, where generating the three-dimensional map of the environment includes determining a refined estimate of the depth of the first object based on matching the points on the successive range-sensor images to the successive camera images.

Example 5. The method of examples 1-4 or any combination thereof, further including estimating a depth of a second object in the environment based on the two or more successive scans and the two or more successive camera images.

Example 6. The method of examples 1-5 or any combination thereof, where generating the three-dimensional map of the environment is based on the depth of the first object and the depth of the second object.

Example 7. The method of examples 1-6 or any combination thereof, further including measuring rotational movement of the camera relative to the range sensor.

Example 8. The method of examples 1-7 or any combination thereof, where generating the three-dimensional map is based on the two or more successive scans, the two or more successive camera images, and the rotational movement of the camera.

Example 9. The method of examples 1-8 or any combination thereof, further including measuring translational movement of the camera relative to the range sensor.

Example 10. The method of examples 1-9 or any combination thereof, where generating the three-dimensional map is based on the two or more successive scans, the two or more successive camera images, and the translational movement of the camera.

Example 11. The method of examples 1-10 or any combination thereof, where receiving the two or more successive scans include receiving, by a radar sensor, the signals reflected from the object.

Example 12. The method of examples 1-11 or any combination thereof, further including performing simultaneous location and mapping based on the two or more successive camera images using the two or more successive scans as a depth constraint.

Example 13. The method of examples 1-12 or any combination thereof, where estimating the depth of the object includes performing a first Fast Fourier Transform on the two or more successive scans to generate an estimate of the depth of the object.

Example 14. The method of examples 1-13 or any combination thereof, further including performing a second Fast Fourier Transform on the two or more successive scans to generate a relative speed of the object.

Example 15. The method of examples 1-14 or any combination thereof, further including performing a third Fast Fourier Transform on the two or more successive scans to generate an estimate of an angle from the range sensor to the object.

Example 16. The method of examples 1-15 or any combination thereof, further including constructing a spatial cost volume for the environment based on the two or more successive camera images.

Example 17. The method of examples 1-16 or any combination thereof, further including determining a pixel-wise uncertainty for the spatial cost volume based on the two or more successive scans and the two or more successive camera images.

Example 18. The method of example 17, where determining the pixel-wise uncertainty for the spatial cost volume is further based on a rotational movement of the camera and a translational movement of the camera.

Example 19. A system includes a range sensor configured to receive signals reflected from objects in an environment and generate two or more successive scans of the environment at different times. The system also includes a camera configured to capture two or more successive camera images of the environment, where each of the two or more successive camera images of the environment is captured by the camera at a different location within the environment. The system further includes processing circuitry configured to generate a three-dimensional map of the environment based on the two or more successive scans and the two or more successive camera images.

Example 20. The system of example 19, where the processing circuitry is configured to perform the method of examples 1-18 or any combination thereof.

Example 21. The system of example 19 or example 20, where the processing circuitry is further configured to match points in the two or more successive scans to points in the two or more successive camera images.

Example 22. The system of examples 19-21 or any combination thereof, where the processing circuitry is configured to generate the three-dimensional map of the environment at least in part by determining an estimate of the depth of a first object in the environment based on the two or more successive scans and the two or more successive camera images.

Example 23. The system of examples 19-22 or any combination thereof, where the processing circuitry is configured to generate the three-dimensional map of the environment at least in part by determining a refined estimate of the depth of the first object based on matching the points on the successive range-sensor images to the successive camera images.

Example 24. The system of examples 19-23 or any combination thereof, where the processing circuitry is further configured to estimate a depth of a second object in the environment based on the two or more successive scans and the two or more successive camera images.

Example 25. The system of examples 19-24 or any combination thereof, where the processing circuitry is configured to generate the three-dimensional map of the environment based on the depth of the first object and the depth of the second object.

Example 26. The system of examples 19-25 or any combination thereof, where the processing circuitry is further configured to measure rotational movement of the camera relative to the range sensor.

Example 27. The system of examples 19-26 or any combination thereof, where the processing circuitry is configured to generate the three-dimensional map based on the two or more successive scans, the two or more successive camera images, and the rotational movement of the camera.

Example 28. The system of examples 19-27 or any combination thereof, where the processing circuitry is further configured to measure translational movement of the camera relative to the range sensor.

Example 29. The system of examples 19-28 or any combination thereof, where the processing circuitry is configured to generate the three-dimensional map based on the two or more successive scans, the two or more successive camera images, and the translational movement of the camera.

Example 30. The system of examples 19-29 or any combination thereof, where the range sensor includes a radar sensor configured to transmit radar signals and receive the signals reflected from the objects in the environment.

Example 31. The system of examples 19-30 or any combination thereof, where the processing circuitry is further configured to perform simultaneous location and mapping based on the two or more successive camera images using the two or more successive scans as a depth constraint.

Example 32. The system of examples 19-31 or any combination thereof, where the processing circuitry is further configured to perform a first Fast Fourier Transform on the two or more successive scans to generate an estimate of a depth of a first object in the environment.

Example 33. The system of examples 19-32 or any combination thereof, where the processing circuitry is further configured to perform a second Fast Fourier Transform on the two or more successive scans to generate a relative speed of the first object;

Example 34. The system of examples 19-33 or any combination thereof, where the processing circuitry is further configured to perform a third Fast Fourier Transform on the two or more successive scans to generate an estimate of an angle from the range sensor to the first object.

Example 35. The system of examples 19-34 or any combination thereof, where the processing circuitry is further configured to construct a spatial cost volume for the environment based on the two or more successive camera images.

Example 36. The system of examples 19-35 or any combination thereof, where the processing circuitry is further configured to determine a pixel-wise uncertainty for the spatial cost volume based on the two or more successive scans and the two or more successive camera images.

Example 37. The system of example 36, where the processing circuitry is configured to determine the pixel-wise uncertainty for the spatial cost volume based on a rotational movement of the camera and a translational movement of the camera.

Example 38. A device includes a computer-readable medium having executable instructions stored thereon, configured to be executable by processing circuitry for causing the processing circuitry to receive, from a range sensor, two or more successive scans of an environment performed by the range sensor at different times, where the two or more successive scans represent information derived from signals reflected from objects in the environment. The device also includes instructions for causing the processing circuitry to receive, from a camera, two or more successive camera images of the environment, where each of the two or more successive camera images is captured by the camera at a different location within the environment. The device further includes instructions for causing the processing circuitry to generate a three-dimensional map of the environment based on the two or more successive scans and the two or more successive camera images.

Example 39. The device of example 38, further including instructions to perform the method of examples 1-18 or any combination thereof.

Example 40. A system includes means for receiving signals reflected from objects in an environment and generating two or more successive scans of the environment at different times. The system also includes means for capturing two or more successive camera images of the environment, where each of the two or more successive camera images of the environment is captured at a different location within the environment. The system further means for generating a three-dimensional map of the environment based on the two or more successive scans and the two or more successive camera images.

Example 41. The device of example 40, further including means for performing the method of examples 1-18 or any combination thereof.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory (NVRAM), electrically erasable programmable read-only memory (EEPROM), or flash memory. The computer-readable storage media may be referred to as non-transitory. A programmer, such as patient programmer or clinician programmer, or other computing device may also contain a more portable removable memory type to enable easy data transfer or offline data analysis.

The techniques described in this disclosure, including those attributed to systems 100 and 200, range sensor 110, camera 120, processing circuitry 130, positioning device 140, and/or memory 150, and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuit (ASICs), field-programmable gate arrays (FPGAs), or any other equivalent integrated or discrete logic circuitry, as well as any combinations of such components, embodied in programmers, such as physician or patient programmers, stimulators, remote servers, or other devices. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between systems 100 and 200, range sensor 110, camera 120, processing circuitry 130, positioning device 140, and/or memory 150. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, systems 100 and 200, range sensor 110, camera 120, processing circuitry 130, positioning device 140, and/or memory 150, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system comprising:
    a range sensor configured to receive signals reflected from an object in an environment and generate two or more successive scans of the environment at different times;
    a camera configured to capture two or more successive camera images of the environment, wherein each of the two or more successive camera images of the environment is captured by the camera at a different location within the environment; and
    processing circuitry configured to:
    construct a spatial cost volume for the environment based on the two or more successive camera images;
    determine a pixel-wise uncertainty for the spatial cost volume based on the two or more successive scans and the two or more successive camera images;
    determine a rough an estimate of a depth of the object in the environment based on the spatial cost volume;
    match points in the two or more successive scans to points in the two or more successive camera images;
    determine a refined estimate of the depth of the object based on the rough estimate of the depth of the object and further based on matching the points on the successive range-sensor images to the successive camera images; and
    generate a three-dimensional map of the environment based on the refined estimate of the depth of the object, the two or more successive scans, and the two or more successive camera images.

2. The system of claim 1,
    wherein the object is a first object,
    wherein the processing circuitry is further configured to estimate a depth of a second object in the environment based on the two or more successive scans and the two or more successive camera images, and
    wherein the processing circuitry is configured to generate the three-dimensional map of the environment based on the refined estimate of the depth of the first object and the depth of the second object.

3. The system of claim 1, wherein the processing circuitry is further configured to:
    measure rotational movement of the camera relative to the range sensor; and
    measure translational movement of the camera relative to the range sensor,
    wherein the processing circuitry is configured to generate the three-dimensional map based on the two or more successive scans, the two or more successive camera images, the rotational movement of the camera, and the translational movement of the camera.

4. The system of claim 1, wherein the range sensor comprises a radar sensor configured to transmit radar signals and receive the signals reflected from the objects in the environment.

5. The system of claim 1, wherein the processing circuitry is further configured to perform simultaneous location and mapping based on the two or more successive camera images using the two or more successive scans as a depth constraint.

6. The system of claim 1, wherein the processing circuitry is further configured to:
perform a first Fast Fourier Transform on the two or more successive scans to generate a third estimate of the depth of the object in the environment and a first estimate of the angle from the range sensor to the object;
perform a second Fast Fourier Transform on the two or more successive scans to generate a relative speed of the object; and
perform a third Fast Fourier Transform on the two or more successive scans to generate a second estimate of an angle from the range sensor to the object.

7. The system of claim 1, wherein the processing circuitry is configured to determine the pixel-wise uncertainty for the spatial cost volume based on a rotational movement of the camera and a translational movement of the camera.

8. A method comprising:
receiving, by processing circuitry from a range sensor, two or more successive scans of an environment performed by the range sensor at different times, wherein the two or more successive scans represent information derived from signals reflected from an object in the environment;
receiving, by the processing circuitry, two or more successive camera images of the environment captured by the camera, wherein each of the two or more successive camera images of the object is captured by the camera at a different location within the environment;
constructing, by the processing circuitry, a spatial cost volume for the environment based on the two or more successive camera images;
determining, by the processing circuitry, a pixel-wise uncertainty for the spatial cost volume based on the two or more successive scans and the two or more successive camera images;
determining, by the processing circuitry, a rough estimate of a depth of the object in the environment based on the spatial cost volume;
matching points in the two or more successive scans to points in the two or more successive camera images;
determining a refined estimate of the depth of the object based on the rough estimate of the depth of the object and further based on matching the points on the successive range-sensor images to the successive camera images; and
generating, by the processing circuitry, a three-dimensional map of the environment based on the refined depth of the object, the two or more successive scans, and the two or more successive camera images.

9. The method of claim 8, wherein the object is a first object, the method further comprising estimating a depth of a second object in the environment based on the two or more successive scans and the two or more successive camera images,
wherein generating the three-dimensional map of the environment is based on the refined estimate of the depth of the first object and the depth of the second object.

10. The method of claim 8, further comprising:
measuring rotational movement of the camera relative to the range sensor; and
measuring translational movement of the camera relative to the range sensor,
wherein generating the three-dimensional map is based on the two or more successive scans, the two or more successive camera images, the rotational movement of the camera, and the translational movement of the camera.

11. The method of claim 8, further comprising performing simultaneous location and mapping based on the two or more successive camera images using the two or more successive scans as a depth constraint.

12. The method of claim 8, further comprising:
performing a first Fast Fourier Transform on the two or more successive scans to generate a third estimate of the depth of the object in the environment and a first estimate of the angle from the range sensor to the object,
performing a second Fast Fourier Transform on the two or more successive scans to generate a relative speed of the object; and
performing a third Fast Fourier Transform on the two or more successive scans to generate a second estimate of the angle from the range sensor to the object.

13. The method of claim 8, wherein determining the pixel-wise uncertainty for the spatial cost volume is further based on a rotational movement of the camera and a translational movement of the camera.

14. A device comprising a computer-readable storage medium having executable instructions stored thereon, configured to be executable by processing circuitry of the device for causing the processing circuitry to:
receive, from a range sensor, two or more successive scans of an environment performed by the range sensor at different times, wherein the two or more successive scans represent information derived from signals reflected from an object in the environment;
receive, from a camera, two or more successive camera images of the environment, wherein each of the two or more successive camera images is captured by the camera at a different location within the environment;
construct a spatial cost volume for the environment based on the two or more successive camera images;
determine a pixel-wise uncertainty for the spatial cost volume based on the two or more successive scans and the two or more successive camera images;
determine a rough estimate of a depth of the object in the environment based on the spatial cost volume;
match points in the two or more successive scans to points in the two or more successive camera images;
determine a refined estimate of the depth of the object based on the rough estimate of the depth of the object and further based on matching the points on the successive range-sensor images to the successive camera images; and
generate a three-dimensional map of the environment based on the refined depth of the object, the two or more successive scans, and the two or more successive camera images.

15. The device of claim 14, further comprising instructions for causing the processing circuitry to:
measure rotational movement of the camera relative to the range sensor; and
measure translational movement of the camera relative to the range sensor,
wherein the instructions to generate the three-dimensional map comprise instructions to generate the three-dimensional map based on the two or more successive scans, the two or more successive camera images, the rotational movement of the camera, and the translational movement of the camera.

16. The system of claim 1, wherein the range sensor is configured to perform the two or more successive scans by transmitting signals across part or all of the environment for a first scan and then transmitting signals across part or all of the environment for a second scan.

17. The method of claim 8, further comprising performing the two or more successive scans by causing the range sensor to transmit signals across part or all of the environment for a first scan and then to transmit signals across part or all of the environment for a second scan.

18. The device of claim 14,
wherein the object is a first object, and
wherein the device further comprises instructions for causing the processing circuitry to:

estimate a depth of a second object in the environment based on the two or more successive scans and the two or more successive camera images; and
generate the three-dimensional map of the environment based on the refined estimate of the depth of the first object and the depth of the second object.

19. The device of claim 14, further comprising instructions for causing the processing circuitry to perform simultaneous location and mapping based on the two or more successive camera images using the two or more successive scans as a depth constraint.

20. The device of claim 14, further comprising instructions for causing the processing circuitry to determine the pixel-wise uncertainty for the spatial cost volume based on a rotational movement of the camera and a translational movement of the camera.

* * * * *